United States Patent [19]

Hlavacek

[11] Patent Number: 4,862,970
[45] Date of Patent: Sep. 5, 1989

[54] GREENS REPAIR TOOL

[76] Inventor: Stephen L. Hlavacek, 3558 Sebaka Trail, Verona, Wis. 53593

[21] Appl. No.: 221,228

[22] Filed: Jul. 19, 1988

[51] Int. Cl.⁴ .............................. A01B 1/04; A01B 1/24
[52] U.S. Cl. .................................. 172/378; 273/32 R; 273/32 B; 273/162 R
[58] Field of Search ................. 273/32 R, 32 A, 32 B, 273/162 R, 32 D, 162 D, 162 F, 193 R, 194 R, 77 R; 172/378, 370, 371; 224/918; 7/151; 81/3.34, 3.35, 177.5, 177.6; 30/151, 162, 163, 164

[56] References Cited

U.S. PATENT DOCUMENTS

| | | | |
|---|---|---|---|
| 1,110,265 | 9/1914 | Janouch | 81/3.35 |
| 1,657,322 | 1/1928 | Shinn | 172/372 |
| 3,049,182 | 8/1962 | Pelow | 172/378 |
| 3,185,483 | 5/1965 | Klynman | 273/162 |
| 3,360,807 | 1/1968 | Mauck | 273/162 F |
| 3,539,017 | 11/1970 | Johnson | 172/378 |
| 3,774,913 | 11/1973 | Dien | 273/162 D |
| 4,007,928 | 2/1977 | Doubt | 273/32 B |
| 4,114,878 | 9/1978 | Hammond | 273/32 A |
| 4,239,216 | 12/1980 | Bauer | 273/32 B |
| 4,315,624 | 2/1982 | Buckman | 273/32 A |
| 4,535,987 | 8/1985 | Dikoff | 273/32 B |
| 4,627,621 | 12/1986 | Tate | 273/32 B |

Primary Examiner—Edward M. Coven
Assistant Examiner—S. Passaniti
Attorney, Agent, or Firm—Lathrop & Clark

[57] ABSTRACT

A greens repair tool is described having an elongated casing which is adapted to be placed in the shaft of a golf club. The casing defines a central chamber for slidably positioning a fork. The fork includes a pair of prongs in spaced substantially parallel position to each other. When not in use, the prongs of the fork are nested in the chamber of the casing out of the way of the golfer. In use, the prongs may be pulled out a certain distance. The golfer may then repair the greens utilizing the entire length of the shaft of the golf club.

9 Claims, 2 Drawing Sheets

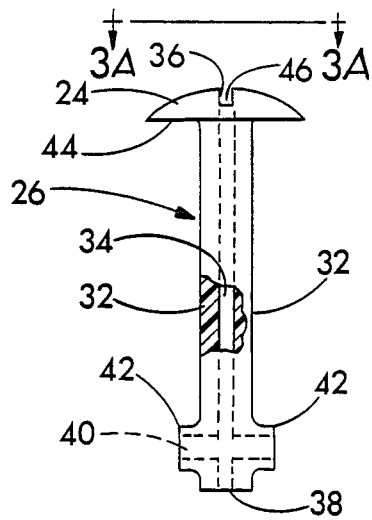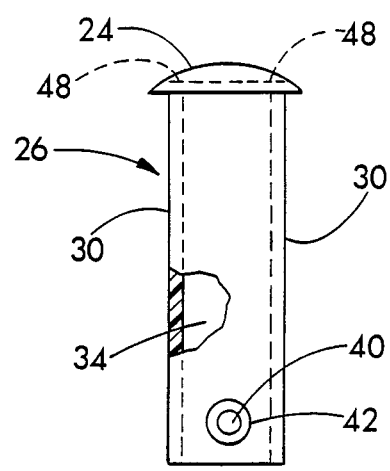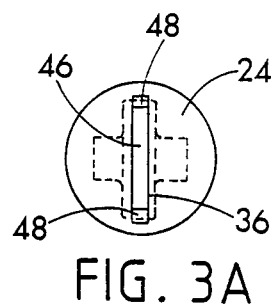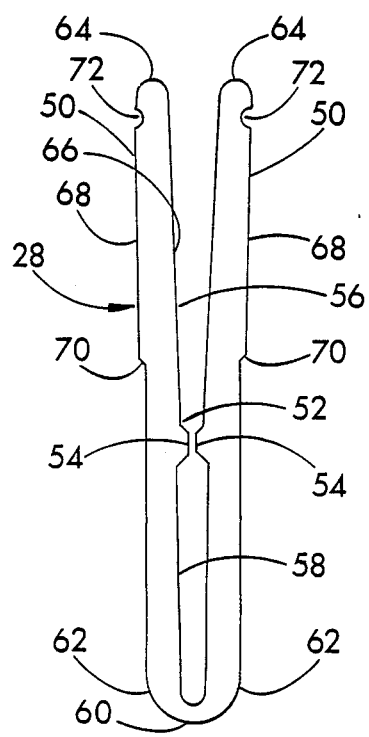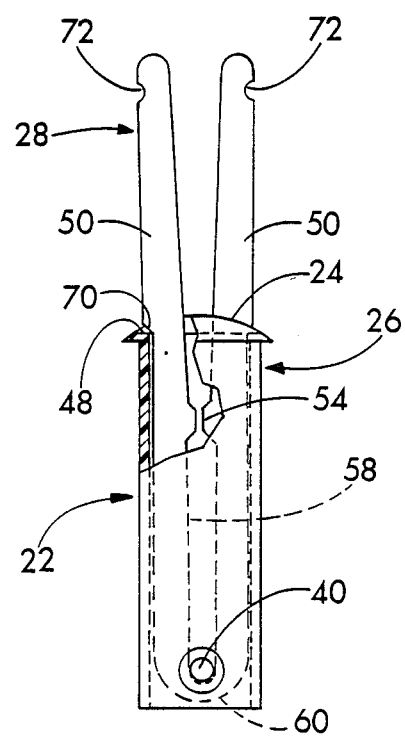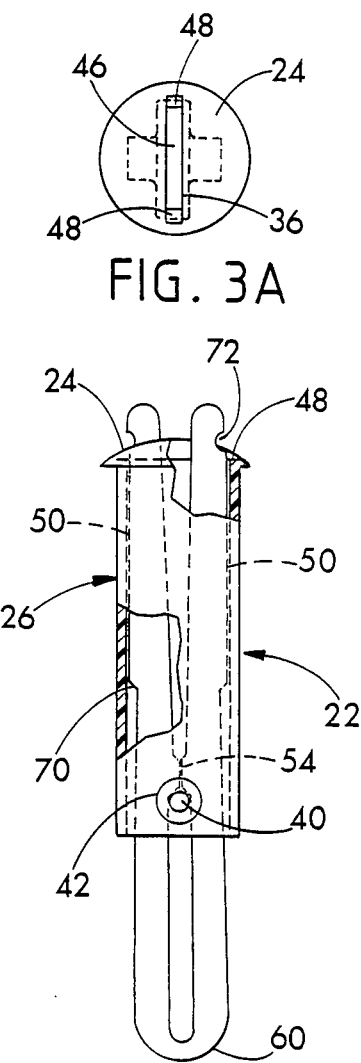
FIG. 3
FIG. 4
FIG. 3A
FIG. 5
FIG. 6
FIG. 7

GREENS REPAIR TOOL

FIELD OF THE INVENTION

The present invention is generally directed to a tool for repairing certain forms of earth. More particularly, the present invention is directed to a tool for repairing the greens used on the putting surface of a golf course. Still more particularly, the present invention is directed to a greens repair tool for repairing the turf on the putting surface of a golf course, wherein the greens repair tool is adapted to be incorporated into the shaft of a putter.

DESCRIPTION OF THE PRIOR ART

Those familiar with the game of golf know of the courtesies which should be adhered to on the golf course. These courtesies are designed to enhance the pleasure of the golf game as well as preserving the quality of the golf course for subsequent players.

The putting green is the most carefully maintained portion of the golf course. It is on this surface that the golfer must execute carefully aimed and stroked shots. On this surface, the golf ball is in constant rolling contact with the putting green surface. Irregularities on the putting green can disrupt the putt. It is therefore expected that the surface of the green will be free of these irregularities.

A common irregularity on the surface of the putting green is known as a ball mark. Ball marks are small crater-like indentations in the surfaces of the putting greens caused by the impact of golf balls landing on the greens. Golf etiquette dictates that golfers should repair ball marks caused by the action of their ball on the golf green. Otherwise, the ball marks result in uneven putting surfaces, dead grass spots on the greens, and increased maintenance and repair costs.

Although golfers should repair their own ball marks, many do not. The reasons for this are plentiful, including but not limited to the following: (1) golfers forget;(2) golfers do not have the proper tool at the time; and (3) golfers do not want to bend over to repair the ball mark. Therefore, any implement which will facilitate the repair of these ball marks will be useful.

Greens repair tools are well known to the art. For example, U.S. Pat. No. 3,049,182 to Pelow describes a three-pronged turf repair tool in which the prong swivels out of a case for use. U.S. Pat. No. 3,539,017 to Johnson discloses a turf repair tool in which a two-prong fork slides out of a case for use.

There are also greens repair tools which have multiple features. For example, U.S. Pat. No. 4,627,621 to Tate discloses a greens repair tool which also acts as a clip, shaft stand, and device for checking the dimensions of a golf ball. U.S. Pat. No. 4,315,624 to Buckman discloses a greens repair tool in combination with a ball marker. U.S. Pat. No. 4,114,878 to Hammond discloses a golf tee provided with an anchor. The anchor could also be used as a greens repair tool. U.S. Pat. No. 4,007,928 to Doubt discloses a greens repair tool which also serves as a prop for a club and a shoehorn. U.S. Pat. No. 4,535,987 to Dickoff discloses a greens repair tool in combination with a bottle opener, cleat remover, stroke-counter and pencil sharpener.

There are also greens repair tools designed to be attached to a golf club. For example, U.S. Pat. No. 1,657,322 to Shinn discloses a turf smoothing device attached near the head of the golf club. U.S. Pat. No. 3,185,483 discloses a greens repair tool attached to the backside of the head of a putter. Further, U.S. Pat. No. 4,239,216 to Bower discloses an implement designed to fit in the shaft of a putter. The implement includes a greens repair tool which is similar to a golf tee and is completely removed from the shaft for use.

While all of the aforementioned patents disclose one form or another of a greens repair tool, there is a need for a simplified tool which can be easily, conveniently and comfortably used.

SUMMARY OF THE INVENTION

It is therefore an object of the present invention to provide a convenient greens repair tool.

It is another object of the invention to provide a greens repair tool adapted to be incorporated into the handle of a putter.

It is another object of the invention to provide a greens repair tool designed to fit into the grip end of a putter such that the tool can be used while still attached to the putter.

These and other objects of the invention are provided by a greens repair tool comprising an elongated casing having two end walls and two side walls, the casing defining a central chamber extending lengthwise within the casing. The casing includes a top opening communicating with the chamber, a bottom opening also communicating with the chamber, and a pin positioned transversely with respect to the side walls of the chamber in the general location of the bottom opening. The casing is adapted to be received in the shaft of a golf club, such as a putter. The greens repair tool also comprises a fork slidably positioned within the chamber of the casing. The fork includes a pair of prongs in spaced substantially parallel position to each other. The spaced position forms a channel between the prongs. Each prong has a free end and a closed end. The closed end defines a bridge member bridging the two prongs together. The bridge member is positioned below the pin such that the bridge member and the lower portion of the fork can slide through the bottom opening of the chamber when the greens repair tool is not to be used. In use, the fork can slide through the chamber out the top opening of the casing, where it is positioned for repairing a ball mark.

The greens repair tool may be used in combination with the shaft of a putter. In this manner, a putter acts as an extension to the greens repair tool casing, enabling the golfer to conveniently repair the turf without having to bend down as far. Additionally, the location of the greens repair tool on the putter serves as a constant reminder to the golfer to repair ball marks. When the forks of the greens repair tool are slid into the shaft of the putter, the greens repair tool will not interfere with the action of the putt.

Further objects, features and advantages of the invention will be apparent from the following detailed description when taken in conjunction with the accompanying drawings.

BRIEF DESCRIPTION OF THE DRAWINGS

In the drawings:

FIG. 3 is an end elevated view of the casing of the greens repair tool.

FIG. 3A illustrates a top elevated view of the casing of FIG. 3 along lines 3A—3A.

FIG. 4 is a side elevated view of the casing of the greens repair tool.

FIG. 5 is a side elevated view of the fork of the greens repair tool.

FIG. 6 is a side elevated view of the greens repair tool showing the position of the fork within the casing when the fork is ready for use.

FIG. 7 is a side elevated view of the greens repair tool of the present invention showing the position of the fork within casing in the closed position.

DETAILED DESCRIPTION OF THE DRAWINGS

The present invention is directed to a greens repair tool in which the fork portion of the greens repair tool may be slidably placed within the casing. Although the greens repair tool may be used as a separate unit, it is specifically adapted to be incorporated into the top end of a golf club.

Figure 1:
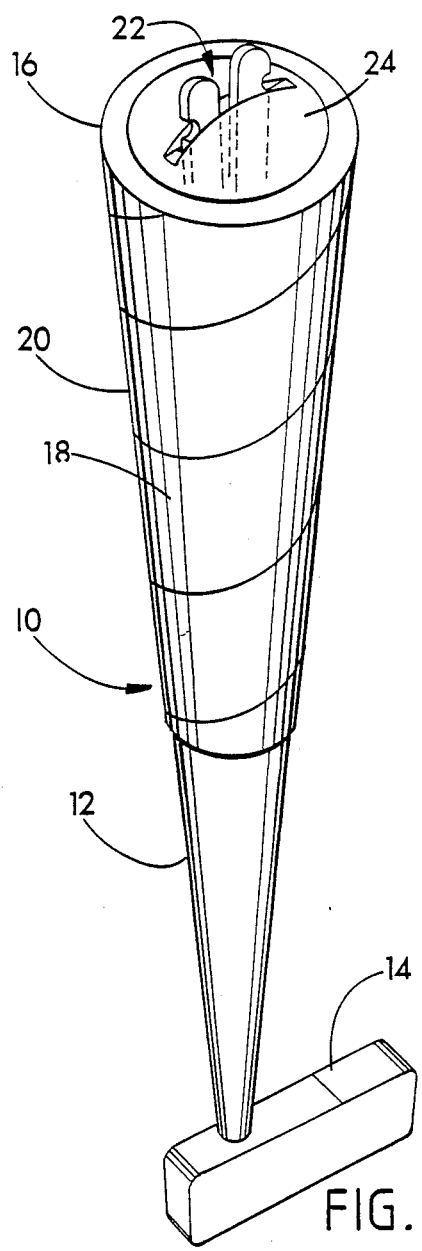
FIG. 1 is an isometric view of a golf club showing the greens repair tool.
Figure 2:
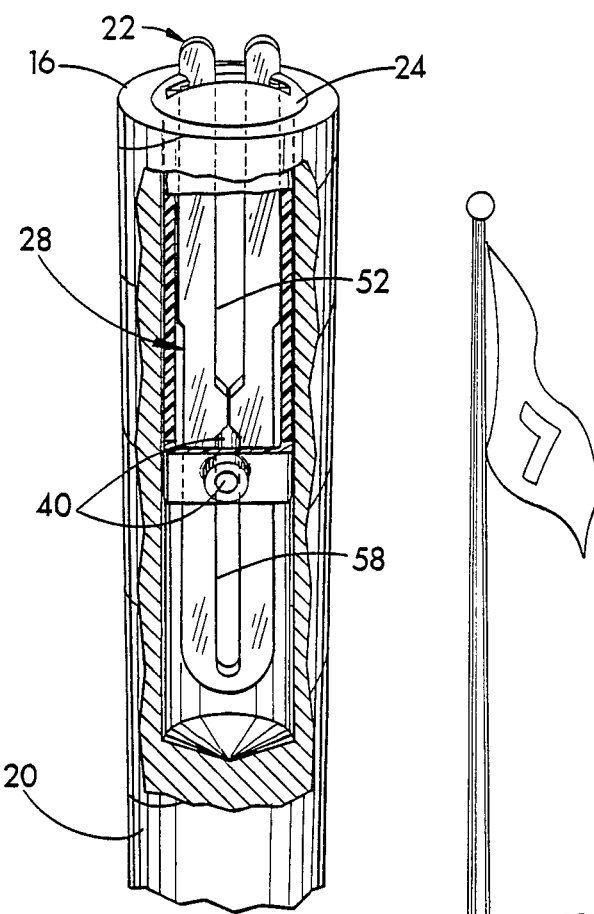
FIG. 2 is an isometric view of a portion of the handle of the putter, wherein the handle has been cut away to show the detail of the greens repair tool.

Reference is now made to the drawings in which the same or similar features will be referred to by like numbers. Referring now to FIGS. 1 and 2, there is illustrated a golf club 10, preferably a putter. The golf club includes a shaft 12 extending upwardly from a club head 14 to the upper end 16. The shaft portion adjacent the upper end is generally wrapped with a cushioning material 18 to form the handle 20.

The shaft 12 is generally formed of a hollow metal tubular construction. In this manner, the greens repair tool 22 of the present invention may be conveniently nested within the top end 16 of the shaft 12. This is accomplished by boring a hole in the top end 16 of the shaft 12 and telescoping the greens repair tool 22 into the top end 16. The greens repair tool 22 is preferably fitted with a flanged cap or collar 24 to correctly position the greens repair tool on the top end 16.

Referring now to FIGS. 2-7, the greens repair tool 22 is illustrated having two basic parts: (1) the housing or casing 26 and the fork 28.

The casing 26 is a generally rectangular elongated housing designed to hold the fork 28. The casing 26 includes two end walls 30 and two side walls 32. The end walls 30 and side walls 32 define a central chamber 34 which houses the fork 28. The casing 26 is further provided with a top opening 36 which communicates with the chamber 34 and a bottom opening 38 which also communicates with the chamber 34. Therefore, the chamber 34 is open at the top and the bottom of the casing 26. Situated near the bottom opening 38 of the chamber 34 and transversely positioned with respect to the side walls 32 is a pin 40. The side walls 32 are preferably enlarged at 42 to accommodate the placement of the pin 40.

As mentioned previously, the casing 26 is preferably provided with a flanged cap 24 to effect proper placement of the greens repair tool 22 in the shaft 12 of the golf club 10. As best illustrated in FIGS. 3 and 4, the cap 24 is beveled to provide a relatively smooth feel at the upper end 16 of the golf club 10. The lower surface 44 of the cap 24 communicates directly with the upper end 16 of the golf club 10 in order to effect a smooth fit. The lower surface 44 is generally in parallel with the upper end 16 of the golf club. Referring now more specifically to FIGS. 3 and 3A, the cap 24 is also provided with a transverse slot 46 which communicates directly with the top opening 36 of the chamber 34. The slot 46 extends beyond both ends of the top opening 36 to form a shelf 48 on either side of the opening 36.

The casing 26 may be made of any suitable plastic, such as commercial plastics, and others. Instead of plastics, various metals or other materials may be used. For example, stainless steel or aluminum may be used to form the casing 26.

FIG. 5 illustrates a preferred embodiment of the fork assembly 28 which is to be slidably positioned within the chamber 34 of the casing 26. The fork includes a pair of legs or prongs 50 arranged in a spaced, substantially parallel position to each other. The spacing between the prongs 50 defines a channel 52 which is divided by means of opposed inward extensions 54 into an upper channel 56 and a lower channel 58. The prongs 50 are generally parallel to each other, although they may converge slightly toward a bridge member 60. The bridge member 60 serves to join the two prongs 50 at the lower ends 62 of each of the prongs 50.

The prongs 50 may be circular, oval or squared in shape, with the square shape being preferred. The tips or free ends 64 of each of the prongs 50 are rounded so as to avoid presenting a safety hazard to the golfer.

As illustrated in FIGS. 2, 6 and 7, the closed end defining the bridge member 60 bridges the two prongs 50 together. The bridge member 60 is positioned below the pin 40 such that the bridge member 60 and the portion of the prong 50 adjacent the lower channel 58 can slide through the bottom opening 38 of the chamber 34 as illustrated in FIG. 7.

Each prong 50 has an inside wall 66 and an outside wall 68. As illustrated best in FIG. 5, the outside wall 68 of each prong 50 is defined by an outward extension starting at 70. The area marked at 70 is known as an edge lock for reasons which will become apparent.

As disclosed previously, the slot 46 of the flanged cap 24 is provided with shelves 48 on either side of the top opening 36. When the fork 28 is in the open position, meaning that it is ready to be used, as illustrated in FIG. 6, the bridge member 60 is positioned adjacent the pin 40. Additionally, the edge lock 70 is in locked communication with the shelf 48 in order to lock the fork 28 into open position for use. Although only one edge lock 70 and shelf 48 is required, it is preferred to have an edge lock 70 and shelf 48 for each prong 50 of the fork 28. In this manner, the golfer is assured that the fork 28 will remain in the open position.

The inward extension 54 of each prong 50 provides an upper border for the lower channel 58 and accordingly marks the other extreme of travel distance of the fork 28 with respect to the pin 40. In the closed position, as illustrated in FIG. 7, the pin 40 is positioned adjacent the inward extensions 54. In this position, only enough of the free ends 64 to enable the golfer to grasp the fork 28 is available above the flanged cap 24.

Each prong 50 of the fork 28 is preferably provided with a groove 72, commonly called a fingernail groove, to assist the user in grasping and pulling out the fork 28 from the closed position, as illustrated in FIG. 7, to the open position, as illustrated in FIG. 6.

Although the fork 28 may be made of a variety of suitable materials, including plastics, fiberglass, etc., it is preferred that the fork be composed of durable material which allows limited flexibility. A preferred material is stainless steel. The fork 28 may then be formed by one piece of stainless steel which is bent at the location of the bridge member 60. In this manner, the fork 28 at the location of the bridge member 60 provides an outward tensile pressure on the prongs 50. This outward pressure is important in maintaining the opened and closed position of the greens repair tool 22. For example, when the greens repair tool 22 is in the closed position, as illustrated in FIG. 7, the outward tensile pressure provided to the prongs 50 causes the outer walls 68 of the prong 50 to press against the inner surface of the end walls 30 of the chamber 26. This frictional tension maintains the fork 28 in the closed position.

When it is desired to place the greens repair tool in the open position, inward pressure produced by, for example, the golfer's fingers, is applied to the outer walls 60 of the prongs 50. The inward pressure dislodges the prongs 50 from the end walls 30 of the chamber 26 and allows the relatively free sliding movement of the fork 28 through the top opening 36 of the chamber 26. When the prongs 50 of the fork 28 are fully extended, as illustrated in FIG. 6, the bridge member 60 is positioned adjacent the pin 40 and the edge locks 70 are in locking communication with the shelves 48. The prongs 50 are then maintained in a fully opened and locked position for use in repairing the putting green.

As illustrated in FIGS. 1 and 2, the greens repair tool 22 is preferably adapted to be placed in the shaft 12 of a golf club 10 near the top end 16. This can be accomplished by boring a hole of sufficient diameter to accept the casing 26 of the greens repair tool 22. Once that hole has been bored, the greens repair tool is simply inserted into the top end 16 of the golf club 10. Depending upon the size of the hole in the upper end 16 of the shaft 12 in relationship to the width of the casing 26, a glue or other cementing compound may be necessary to maintain the greens repair tool 22 in the shaft 12.

When the greens repair tool 22 is seated in the shaft 12, as illustrated in FIG. 1, it will serve as a reminder to the golfer to police his ball marks. However, when the greens repair tool is in the closed position, as illustrated in FIGS. 1, 2 and 7, it should not present any problems in putting.

Figure 8:
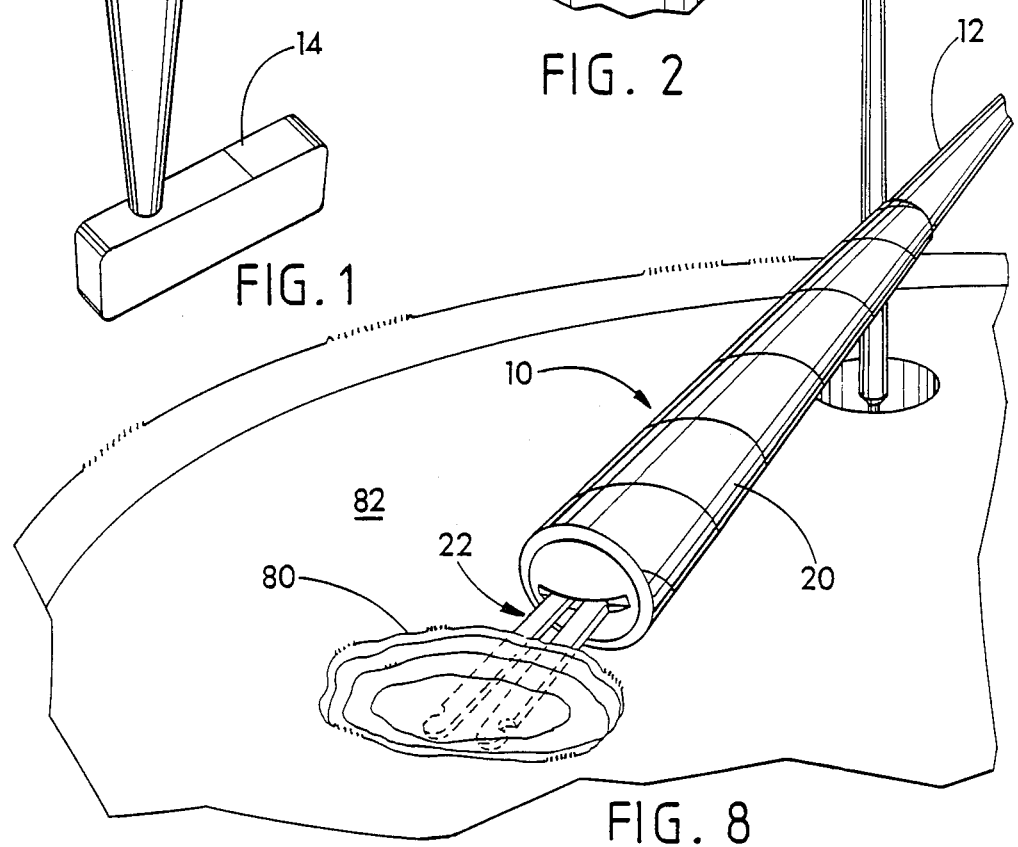
FIG. 8 is a perspective view of a putting green.

Referring now to FIG. 8, which illustrates a putting green on a golf course, a ball mark 80, usually caused by a golf ball, is shown. To repair the damage illustrated in FIG. 8, the golfer grasps the free ends 64 of the prongs 50 and pulls the fork 28 into the open position, as illustrated in FIG. 6. Then by holding the shaft 12 of the golf club 10 at a position near the head 14, the prongs 50 can be manipulated into the damaged area caused by the ball mark 80 and gently worked in order to "fluff" the area of the ball mark 80. The prongs 50 are then extracted. Any residual unevenness can then be removed by any manner known to the art. The preferred manner is to pat the lower surface of the head 14 of the golf club on the unevenness in order to smooth the green out. The advantage to the present invention is that the ball mark 80 can be repaired without necessitating any stooping or kneeling on the part of the golfer as the entire length of the shaft 12 serves the function of a handle for the greens repair tool 22.

It is understood that the invention is not confined to the particular construction and arrangement herein illustrated and described, but embraces such modified forms thereof as come within the scope of the following claims.

What is claimed is:

1. A greens repair tool comprising:
   (a) an elongated casing of generally rectangular shape and having two end walls and two side walls, the casing including a central chamber extending lengthwise within the casing, a top opening communicating with the chamber, a flanged cap adjacent the top opening, a bottom opening communicating with the chamber and a pin positioned transversely with respect to the chamber in the general location of the bottom opening, wherein the casing is adapted to be received in the shaft of a golf club;
   (b) a fork slidably positioned within the chamber of the casing, the fork including a pair of prongs each having an inside wall and an outside wall wherein the prongs are spaced in substantially parallel position to each other, the spaced position forming a chamber between the prongs, wherein the prongs have a free end and a closed end, the closed end defining a bridge member bridging the two prongs, wherein the bridge member is positioned below the pin such that the bridge member and the lower portion of the fork is adapted to slide through the bottom opening of the chamber; and
   (c) means to lock the fork in open position for use, the means including a slot in the flanged cap, wherein the slot is in communication with the chamber to allow the fork to slidably pass therethrough and is provided with at least one shelf adjacent the chamber, and an outward extension provided on the outside wall of at least one prong, wherein the outward extension is adapted to communicate with the shelf to lock the fork in open position for use.

2. The greens repair tool of claim 1 wherein the casing is formed of plastic or metal.

3. The greens repair tool of claim 1 wherein the chamber slot is provided with two shelves and the outside walls of each prong are provided with an outward extension, wherein the outward extensions of each of the prongs are adapted to communicate with the shelves in the slot to lock the fork in open position for use.

4. The greens repair tool of claim 1 wherein the free ends of each of the prongs are rounded.

5. The greens repair tool of claim 1 wherein each prong is provided with a groove to facilitate the movement of the fork within the chamber.

6. The greens repair tool of claim 1 wherein the bridge member is formed of a material providing outward tensile pressure on the prongs.

7. The greens repair tool of claim 6 wherein the fork is a one piece stainless steel unit having a bend at the bridge member, wherein the band provides outward tensile pressure on the prongs.

8. A greens repair tool comprising:
   (a) an elongated casing, the casing defining a central chamber extending lengthwise within the casing, a top opening communicating with the chamber, a bottom opening communicating with the chamber and a pin positioned transversely with respect to the chamber in the general location of the bottom opening, wherein the casing is adapted to be received in the shaft of a golf club; and
   (b) a fork slidably positioned within the chamber of the casing, the fork including a pair of prongs each having an inside wall and an outside wall spaced in substantially parallel position to each other, the spaced position forming a chamber between the prongs, wherein the groups have a free end and a closed end, the closed end defining a bridge member bridging the two prongs, wherein the bridge member is positioned below the pin such that the bridge member and the lower portion of the fork is adapted to slide through the bottom opening of the chamber, wherein the inside wall of at least one prong is provided with an inward extension, the inward extension providing an upper border for the pin.

9. The greens repair tool of claim 8 wherein the inside wall of each prong is provided with an inward extension in spaced relationship to each other, such that the inward extension and the bridge member define a lower channel in which the pin is positioned.

* * * * *